(12) United States Patent
Hu et al.

(10) Patent No.: US 7,202,952 B2
(45) Date of Patent: Apr. 10, 2007

(54) FABRICATION AND ALIGNMENT DEVICE

(75) Inventors: Charles Hu, San Francisco, CA (US); John Moller, Castro Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 275 days.

(21) Appl. No.: 10/925,388

(22) Filed: Aug. 25, 2004

(65) Prior Publication Data

US 2005/0046974 A1  Mar. 3, 2005

Related U.S. Application Data

(60) Provisional application No. 60/498,272, filed on Aug. 27, 2003, provisional application No. 60/498,151, filed on Aug. 27, 2003.

(51) Int. Cl.
*G01B 11/00* (2006.01)
(52) U.S. Cl. ............ 356/400; 356/399; 356/153; 359/641
(58) Field of Classification Search .......... 356/153, 356/399, 400
See application file for complete search history.

(56) References Cited

U.S. PATENT DOCUMENTS

| | | | |
|---|---|---|---|
| 3,987,676 A | 10/1976 | Bennewitz | |
| 4,128,697 A | 12/1978 | Simpson | |
| 4,375,578 A | 3/1983 | Mitchell et al. | |
| 4,769,684 A | 9/1988 | Crocker et al. | |
| 4,772,123 A * | 9/1988 | Radner | 356/153 |
| 4,818,099 A | 4/1989 | Preikschat et al. | |
| 5,127,074 A * | 6/1992 | Watanabe et al. | 385/93 |
| 5,212,345 A | 5/1993 | Gutierrez | |
| 5,315,680 A * | 5/1994 | Musk et al. | 385/88 |
| 5,463,215 A * | 10/1995 | Alfille | 250/206.1 |
| 5,545,846 A | 8/1996 | Williams et al. | |
| 5,710,672 A * | 1/1998 | Roberts et al. | 359/819 |
| 5,916,458 A * | 6/1999 | Komoriya et al. | 219/121.63 |
| 6,113,284 A * | 9/2000 | Wu et al. | 385/92 |
| 6,168,319 B1 * | 1/2001 | Francis | 385/79 |
| 6,208,419 B1 * | 3/2001 | Yamamoto et al. | 356/400 |
| 6,521,989 B2 | 2/2003 | Zhou | |
| 6,586,678 B1 | 7/2003 | Rosenberg et al. | |
| 6,678,047 B1 * | 1/2004 | Miyazaki et al. | 356/399 |
| 6,703,561 B1 | 3/2004 | Rosenberg et al. | |
| 6,872,009 B2 * | 3/2005 | Wisecarver | 385/92 |
| 6,931,714 B2 * | 8/2005 | Wisecarver et al. | 29/702 |

(Continued)

OTHER PUBLICATIONS

The Photonics Dictionary, vol. 4, Lauren Publishing, Pittsfield, MA, 2003, p. D-151.*

(Continued)

*Primary Examiner*—Gregory J. Toatley, Jr.
*Assistant Examiner*—David H. Parker
(74) *Attorney, Agent, or Firm*—Workman Nydegger (57) ABSTRACT

A system for actively aligning an optoelectronic device including a frame, a mounting and alignment assembly, and a camera. The mounting and alignment assembly can be movably connected to the frame and is configured to mount separate portions of an optoelectronic device such that the portions can be moved in relation to each other. An optical signal from a laser in the first portion is transmitted through an optical element in the second portion and captured by the camera to determine the positioning of the first and second portions of the optoelectronic device. The portions can then be aligned accordingly.

9 Claims, 7 Drawing Sheets

U.S. PATENT DOCUMENTS

| | | | |
|---|---|---|---|
| 6,984,077 B2* | 1/2006 | Bush et al. | 385/97 |
| 7,103,953 B2* | 9/2006 | Wisecarver et al. | 29/407.01 |
| 2003/0184752 A1* | 10/2003 | Kogan et al. | 356/400 |
| 2003/0197254 A1 | 10/2003 | Huang | |
| 2004/0021865 A1* | 2/2004 | Byer et al. | 356/399 |
| 2004/0084641 A1* | 5/2004 | Wisecarver et al. | 250/559.3 |
| 2004/0197254 A1 | 10/2004 | Farr | |
| 2005/0046844 A1* | 3/2005 | Hu | 356/399 |
| 2005/0046974 A1* | 3/2005 | Hu et al. | 359/819 |
| 2005/0047731 A1* | 3/2005 | Hu et al. | 385/92 |
| 2005/0207707 A1* | 9/2005 | Hu | 385/55 |
| 2006/0187454 A1* | 8/2006 | Shih et al. | 356/400 |

OTHER PUBLICATIONS

Murata, S., Nishimura, K., *Improvement in Thermal Properties of a Multi-Beam Laser Diode Array*, Japanese Journal of Applied Physics, vol. 28, Suppl. 28-3, pp. 165-170 (1989).

* cited by examiner

FABRICATION AND ALIGNMENT DEVICE

CROSS-REFERENCE TO RELATED APPLICATIONS

This application claims the benefit of U.S. Provisional Patent Application Ser. No. 60/498,272, filed Aug. 27, 2003 and entitled, "Fabrication and alignment Device," and also claims the benefit of U.S. Provisional Patent Application Ser. No. 60/498,151, filed Aug. 27, 2003, and entitled "Method for Optically Aligning Laser Assembly With Housing," which applications are hereby incorporated by reference in their entireties.

BACKGROUND OF THE INVENTION

1. The Field of the Invention

The present invention relates generally to methods for aligning the components of an optoelectronic device, such as a laser package for use in an optical transmitter or transceiver.

2. The Related Technology

Optoelectronic devices are commonly packaged as part of an assembly of mechanical, electrical, and optical components designed to couple light into other optical elements. As one example, an individual optoelectronic device may be packaged to couple light into a single optical fiber. As another example, optoelectronic devices may comprise an array of receivers or transmitters that is packaged as part of a connector assembly for coupling light into an array of optical fibers.

Optoelectronic devices that are optically coupled to other devices or waveguides typically need to be suitably aligned so as to effectively pass an optical signal between the various devices. However, as the alignment requirements of optoelectronic devices become more stringent, existing alignment techniques sometimes result in variances greater than the allowed tolerance, resulting in waste and low yields.

BRIEF SUMMARY OF AN EXEMPLARY EMBODIMENT OF THE INVENTION

Exemplary embodiments of the invention are directed to systems and methods for optically aligning an optoelectronic device so as to enable effective and efficient transmission of optical signals within optoelectronic devices, and between the optoelectronic devices and other devices.

The methods of the present invention apply to actively aligning an optoelectronic device such as a laser package during assembly of the laser package. In addition, the present invention applies to actively aligning other optical elements with an optoelectronic device. For example, an assembled laser package can be actively aligned with another optical element such as, but not limited to, an optical fiber, a lens, an isolator, a collimator, a filter, a circulator, and the like.

An exemplary laser package can include a header structure, an optical transmitter such as a laser, an active temperature controller, a lens, and a header can. In one exemplary embodiment, the housing of the laser package includes a header structure and a header can. The various other parts of the laser package are attached so as to be situated within the housing. For example, the laser may be mounted to an active temperature controller which is, in turn, attached to the header structure, while the lens is mounted inside the header can. Exemplarily, the invention provides a method for actively aligning the header structure, which carries the laser and the temperature controller, with the header can that carries the lens.

Consistent with the foregoing, one exemplary embodiment of a system for actively aligning an optoelectronic device includes a fabrication and alignment device for actively aligning the header structure having the laser with the header can containing a lens. This exemplary embodiment of the fabrication and alignment device include, among other things, a frame, a mounting and alignment assembly, and a camera. The mounting and alignment assembly holds two portions of an optoelectronic device apart to be aligned and then brought together for bonding. As such, the mounting and alignment assembly can be separated into two or more mounts connected at least indirectly to the frame. Each mount can be fixedly connected in relation to the frame or can be movable in relation to the frame. In addition, the camera can be movable in relation to the mounting and alignment assembly. In this manner, the portions of the optoelectronic device having the lens and laser can be selectively positioned to obtain the optimal alignment and the camera can also be moved as needed to simplify or enhance alignment of the optoelectronic device.

In one exemplary embodiment of the alignment method, power is provided to the laser, causing the laser to generate an optical signal which is then directed through the lens. As the optical signal passes through the lens, a camera with a zoom lens receives an image of the resulting signal which is compared to a tolerance range to determine if the positioning of the laser relative to the lens is within a desired tolerance. The position of the header structure and header can are then adjusted relative to one another so as to cause their alignment to be within a desired tolerance range, at which point the header structure and header can be joined together by a suitable process such as resistance projection welding, for example.

The ability to accurately align the optoelectronic devices enables the manufacture of transmitters or transceivers capable of allowing optical signals generated by the laser to be effectively and reliably transmitted through the lens and into an attached optical fiber or other optical element or optoelectronic device.

BRIEF DESCRIPTION OF THE DRAWINGS

In order that the manner in which the above recited and other benefits, advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF AN EXEMPLARY EMBODIMENT

I. Introduction

Exemplary embodiments of the invention are directed to systems and methods for optically aligning optoelectronic devices so as to enable effective and efficient transmission of optical signals within optoelectronic devices, and between the optoelectronic devices and other devices. Optoelectronic devices are commonly packaged as part of an assembly of mechanical, electrical, and optical components designed to couple light into other optical elements.

A detailed description of exemplary embodiments of the invention will now be provided with specific reference to figures illustrating various stages and other aspects of the method of the present invention. It will be appreciated that like structures will be provided with like reference designations.

II. An Exemplary Optical Component

For purposes of describing the invention, an optoelectronic laser package will be described. However, it will be appreciated that the laser package is only provided by way of illustration and not by limitation and that the methods of the present invention can also apply to actively aligning an optoelectronic device with another optical element for example, but not limited to, an optical fiber, an isolator, a collimator, a filter, or a circulator, and the like.

Figure 1:
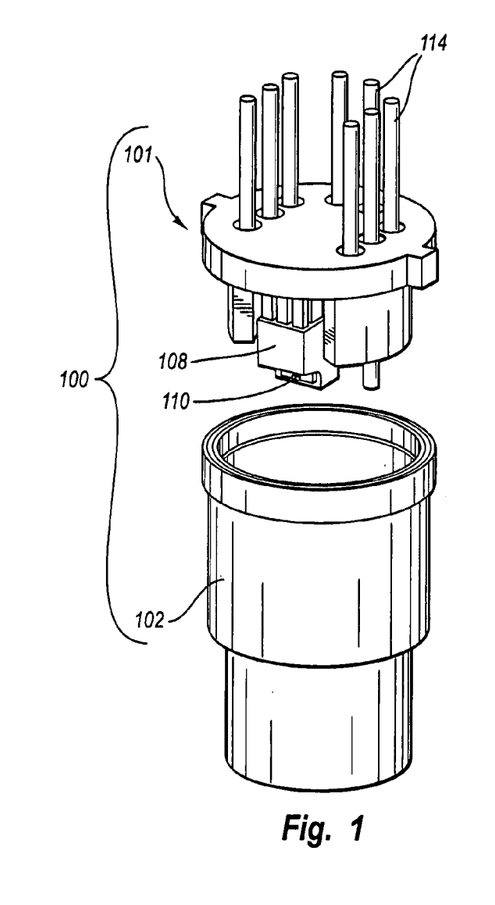
FIG. 1 is a perspective view of exemplary elements of an optoelectronic device suitable for alignment in accordance with one embodiment of the invention.
Figure 2:
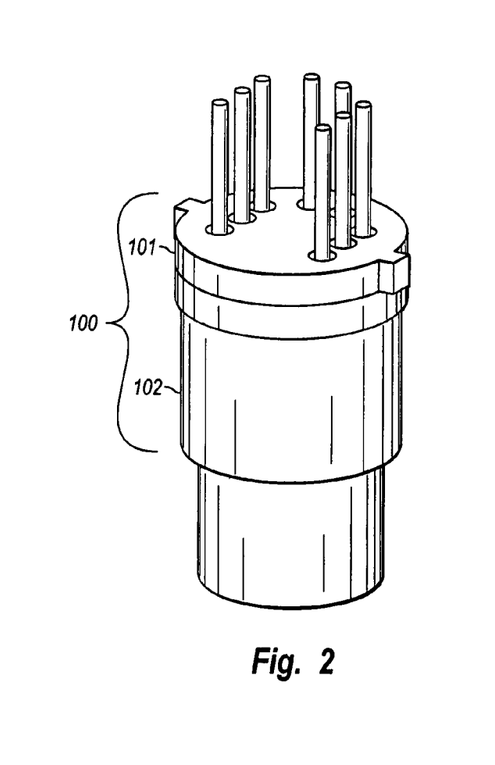
FIG. 2 is a perspective view of the exemplary elements of FIG. 1 in an aligned and assembled configuration.
Figure 3:
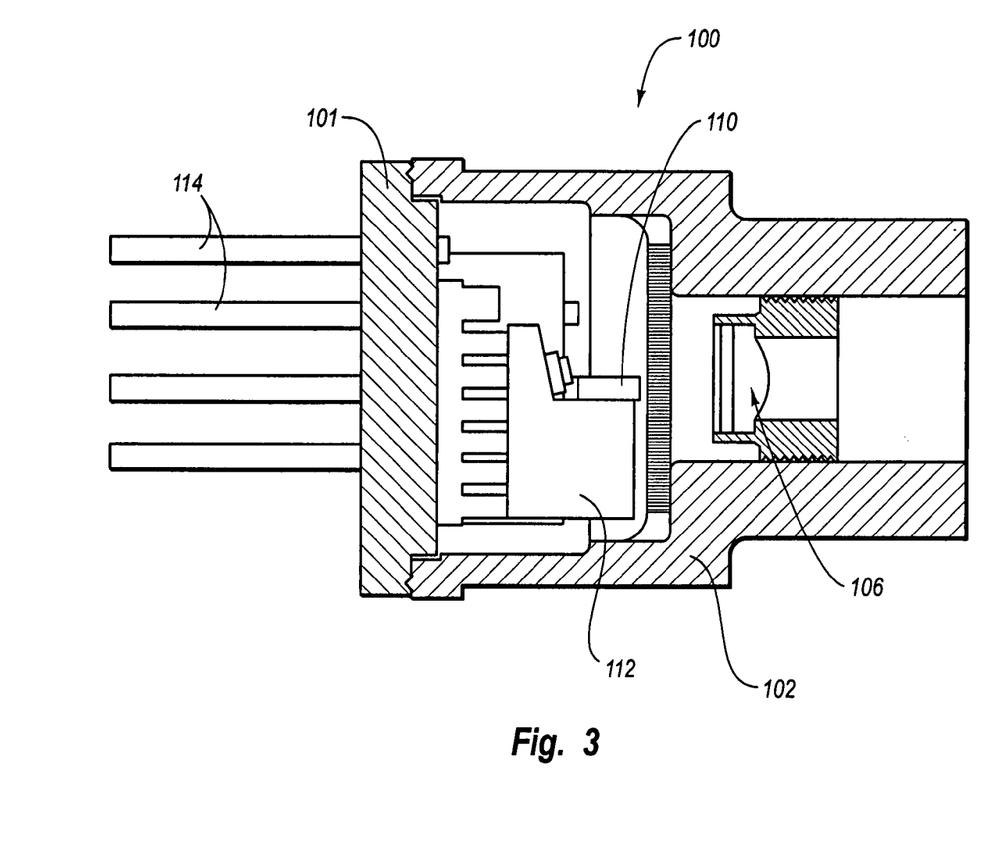
FIG. 3 is a cross section view of the assembled optoelectronic device of FIG. 2.

FIG. 1 illustrates an exemplary laser package 100 having a header structure 101 and a header can 102. FIG. 1 is a perspective view of the laser package 100 prior to attachment of the header structure 101 to the header can 102. FIG. 2 illustrates the same laser package 100 but in an assembled configuration, while FIG. 3 illustrates a cross section of the assembled configuration of FIG. 2. It should be noted here that the Figures simply illustrate one example of an optoelectronic device that may be produced using the alignment and assembly methods disclosed herein. Such methods may, more generally, be employed in connection with the assembly of any of a variety of other optoelectronic devices as well and the scope of the invention should, accordingly, not be construed to be limited to the use of such methods in connection with any particular optoelectronic device.

As indicated in the Figures, laser package 100 includes a header structure 101 configured to mate with header can 102. When assembled, the header structure 101 and the header can 102 together form the housing of laser package 100. The header can 102 includes a lens 106 (FIG. 3). Exemplarily, the lens 106 is situated approximately at the center of the header can 102 so as to be positioned to pass optical signals emitted by the laser 110 (FIG. 3).

When assembled, the envelope of the laser package 100 is comparable in size and configuration to that of a transistor outline ("TO") package. Thus, laser packages assembled in accordance with the method disclosed herein can be fitted within optoelectronic transceiver or transmitter modules that are constructed according to standardized form factor requirements, for example, GigaBit Interface Converter ("GBIC"), and Small Form Factor Pluggable ("SFP"). It will be appreciated that the laser package 100 and/or associated alignment method are adaptable to various existing or yet to be determined transceiver or transmitter module form factors, and various other optical components as well.

As shown in FIGS. 1 through 3, the exemplary header structure 101 further includes an active temperature control device 108. A laser 110, exemplarily implemented as a laser diode, is mounted to the active temperature control device 108 via a laser submount 112, as best illustrated in FIG. 3. The laser submount 112 may be made of aluminum nitride, silicon, or other suitable materials, and the laser submount 112 may incorporate one or more integrated passive components, such as resistors, capacitors, and inductors, for example, to provide improved impedance matching and signal conditioning. The header structure 101 also includes multiple leads 114 for connecting components inside the laser package 100 to the exterior of the laser package 100.

Generally, the laser 110 is positioned and aligned with the lens 106 such that optical signals generated by the laser 110 are aimed at and transmitted through the lens 106. The lens 106 is configured to provide a collimating and focusing effect on the optical signal generated by the laser 110. Alignment of the lens 106 to the laser 110 is important because precise alignment results in improved capture of the optical signal generated by the laser 110. The combination of precise alignment and collimating effect of the lens 106 aids the optical signal in being properly introduced into an optical fiber, or other optical element or optoelectronic device, arranged in optical communication with the laser package 100.

Exemplarily, the lens 106 is configured to provide a collimating or focusing effect on the optical signal generated by the laser 110. In some cases, the laser package 100 includes a glass window in place of the lens 106. Lens 106 is one example of an optical element that can be used in an optoelectronic device of the present invention. Other optical elements include, but are not limited to, an optical fiber, a window, an isolator, a collimator, a filter, a circulator, and the like.

In one exemplary embodiment, the header structure 101 is made by metal injection molding ("MIM"). The material used for making the header structure 101 should be suitable for MIM, resistance projection welding to the header can 102, glass sealing of leads 114 for hermiticity, and plating. Examples of suitable materials include cold-rolled steel, Alloy 42, which is an alloy of nickel and iron, or copper tungsten (CuW) alloys. The header can 102 may also be made of Alloy 42 or other suitable material. One embodiment for constructing header can 102 is disclosed in U.S. patent application Ser. No. 10/832,699, filed Apr. 27, 2004, and entitled "Packaging Assembly for Optical Subassembly," which application is incorporated by reference in its entirety. In some exemplary embodiments, the header can 102 is plated with electrolysis nickel.

Finally, the laser package 100 may also include bond wires (not shown) to provide electrical power from the leads 114 to the various powered devices such as, for example, the laser 110, a temperature sensor, or other devices.

III. An Exemplary Device for Actively Aligning an Optoelectronic Device

Figure 4:
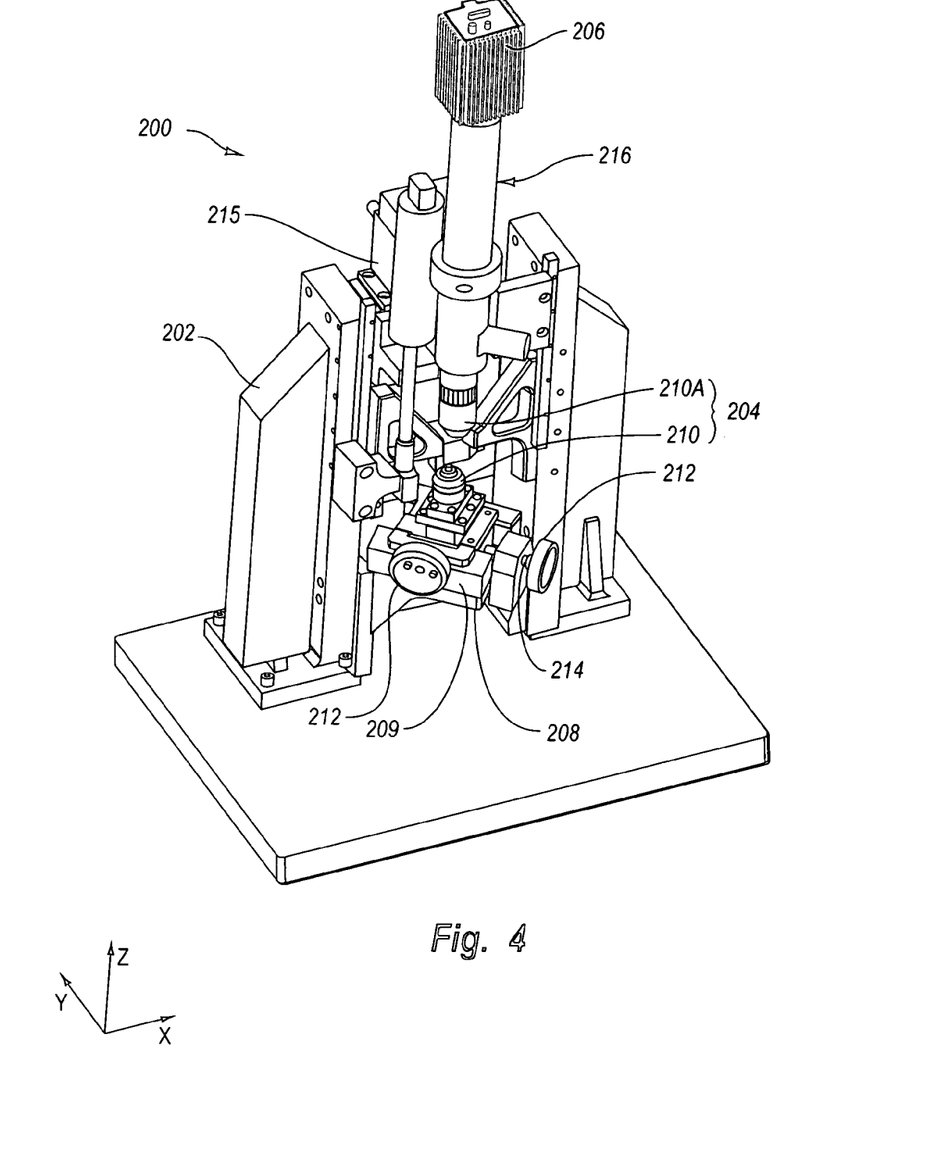
FIG. 4 is a perspective view of an exemplary embodiment of a fabrication and alignment device for actively aligning optoelectronic devices such as the exemplary optoelectronic device illustrated in FIG. 1.
Figure 5:
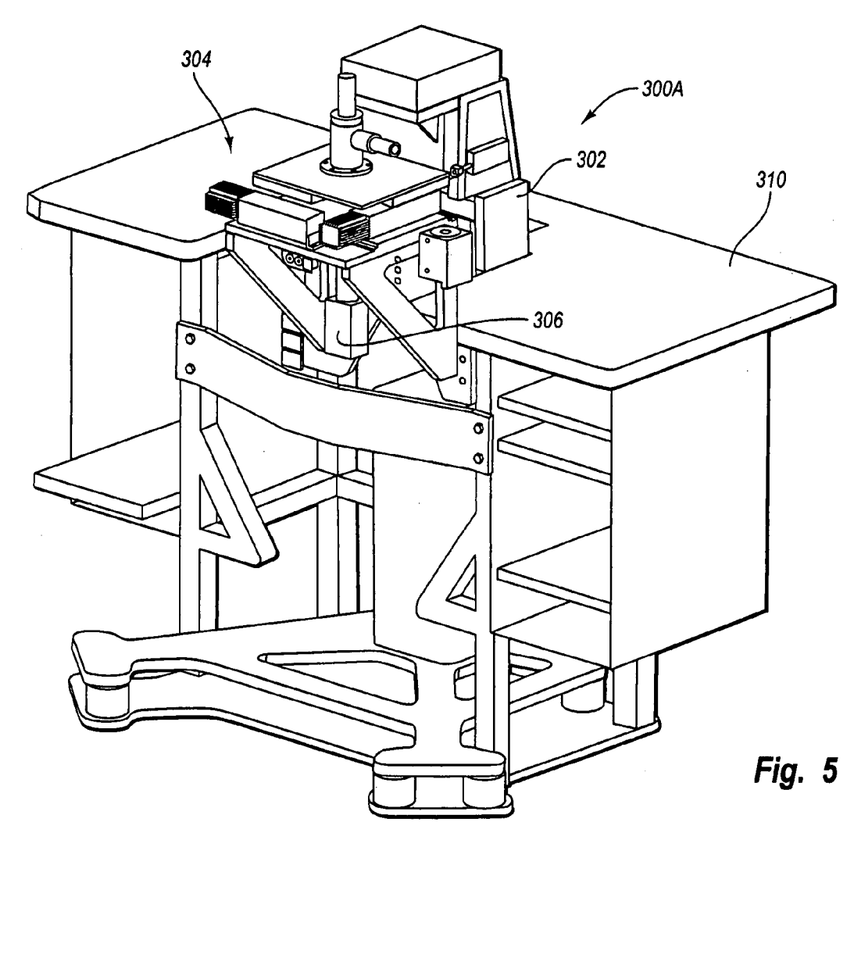
FIG. 5 is a perspective view of another embodiment of a fabrication and alignment device, illustrating the bottom portion of the fabrication and alignment device.
Figure 6:
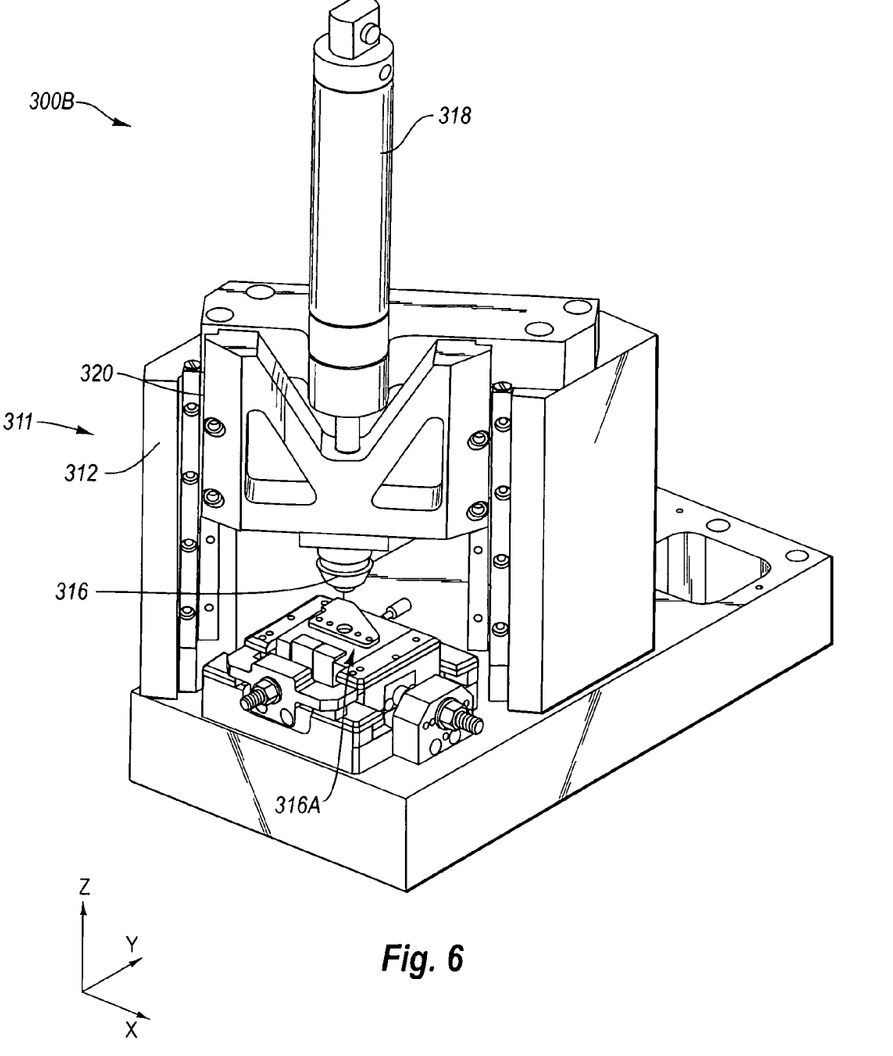
FIG. 6 is a perspective view of the top portion of the fabrication and alignment device which operates in cooperation with the bottom portion illustrated in FIG. 5.

FIGS. 4 through 6 illustrate exemplary embodiments of a system for actively aligning an optoelectronic device. As shown in FIG. 4, in one embodiment, an exemplary fabrication and alignment device 200 includes a frame 202, a mounting and alignment assembly 204, and a camera 206.

The mounting and alignment assembly 204 is configured to perform the dual functions of securely retaining the portions of the optoelectronic device which are to be secured together and of bringing them in contact with each other in such a manner that they are aligned. In a preferred embodiment, the mounting and alignment assembly 204 secures the portions of the optoelectronic device which have been actively aligned during connection of the portions so that the resulting assembled optoelectronic device remains aligned.

Thus, in one embodiment, the mounting and alignment assembly 204 includes a first mount 210 for releasably retaining a first portion of the optoelectronic device and a second mount 210A for releasably retaining a second portion of the optoelectronic device. Where the optoelectronic device is a laser package 100 described above, the first portion of the optoelectronic device is header structure 101 containing laser 110 and the second portion is the header can 102 containing the lens 106. Thus, first mount 210 and the second mount 210A can, in one embodiment, be connected to separate portions of frame 202.

In accordance with the dual functions described above for the mounting and alignment assembly 204, at least one of the first mount 210 or second mount 210A is movable in at least one dimension. In one embodiment, the first mount 210 is movable in relation to frame 202 while second mount 210A is fixedly connected to frame 202. However, it will be appreciated that first mount 210 can be fixedly connected to frame 202 or that both first mount 210 and second mount 210A can be movable in relation to frame 202. In still another embodiment, mount 210 could be movable in both the X direction and the Y direction. Yet in another embodiment, mount 210 could be configured to move in the X direction while mount 210A can be configured to move in the Y direction, and vice versa. Other configurations may additionally apply in accordance with teachings herein.

The mount 210 or 210A that is movable is connected to an alignment assembly 208. The alignment assembly 208 includes means for moving a mount in at least one dimension. In one embodiment, the alignment assembly 208 is able to move in at least the x and y direction. As illustrated in FIG. 4, the alignment assembly 208 includes a base 209 upon which is disposed mount 210. A threaded rod 214 is disposed through mount 210 and is attached to a wheel 212. Turning the wheel 212 can thus move the mount 210 along base 209. A threaded rod 214 and wheel 212 can be provided for each direction in which it is desired to be able to move mount 210. For example, where mount 210 is to be movable along both an X and Y axis, two threaded rods 214 and wheels 212 can be provided at perpendicular directions. Each wheel 212 may be adjusted independently, with each wheel moving the mount 210 (with its attached portion of the optoelectronic device) in the "x" or "y" axis relative to the plane of the mount 210. Other suitable means for moving mount 210 or 210A may include threaded rods in combination with dials, knobs, or wheels. Alternatively, pull rods or other mechanical structure could be used. Optionally, the means for aligning, for example, wheels 212 and rods 214, can be motorized for electronic control, for example, by a computer.

In addition, in one embodiment, the mounting and alignment assembly 204 is configured so that at least one of the mounts 210, 210A is movable in the Z-direction so that after the first portion and second portion of the optoelectronic device are actively aligned, they can be brought together to be connected. Thus, alignment assembly 208 can include a means 215 for moving at least one of the mounts 210, 210A along the Z-direction perpendicular to the plane cooperatively defined by the "x" and "y" axes. In one embodiment, the means 215 for moving at least one of the mounts 210, 210A may be a pneumatic cylinder associated with mount 210A. It will be appreciated that either or both of mounts 210, 210A may include a means for moving the mount in the Z-direction. Other means for moving the mounts 210 and/or 210A in the Z-direction include any of the structures described above with respect to moving mount 210 in the X direction and/or Y direction.

Further, in some embodiments, camera 206 can be configured to move in at least one dimension. For example, the camera 206 can be configured to move in the Z direction while mount 210 moves in the X and/or the Y direction and mount 210A remains stationary. In accordance with the foregoing, it will be appreciated that each of mount 210, 210A, and camera 206 can be configured to be stationary or movable as best required for aligning the first portion of the optoelectronic device and the second portion of the optoelectronic device while maintaining alignment between the lens 106 and the camera 206. Each of mount 210, 210A and camera 206 can additionally be made movable or fixed in order to bring the first and second portions of the optoelectronic device together for bonding.

With further reference to FIG. 4, fabrication and alignment device 200 also includes camera 206 which exemplarily includes a zoom lens 216. An optical signal from the laser contained in a first portion of the optoelectronic device passes through the zoom lens 216 and is captured by camera 206. The optical signal is then compared to a reference which indicates a desired tolerance range.

Zoom lens 216 allows relatively small changes in the relative alignment of the laser 110 and the optical element to be readily apparent (illustrated in FIGS. 7 and 8), and thereby enables precise alignment of the laser 110 and optical element relative to each other. In some embodiments, the magnification of the zoom lens 216 is between about 50× and about 300×. In some cases, a magnification of between about 100× and about 300× is employed, with a magnification of about 200× being particularly useful. The magnification employed will vary from one application to another, and embodiments of the invention are not limited to any particular magnification or range of magnification.

In one embodiment, mounts 210A and 210 are constructed of copper tungsten, with a positive connection between them and one of them connected to a ground wire. After lens 106 and laser 110 are aligned, the pneumatic cylinder 215 increases the pressure between the first portion of the optoelectronic device and the second portion of the optoelectronic device. The resistant weld is discharged to make a tack weld or a hermetic weld. To make a hermetic seal, the process should preferably be completed in a nitrogen environment.

In some cases, the structure of the optoelectronic device which is to be actively aligned assists the fabrication and alignment device 200 in performing its desired function. For example, lens 106 of laser package 100 may provide a degree of magnification that is useful during the alignment process. In one embodiment, lens 106 is configured such that when the lens 106 is relatively closer to the laser 110, the magnification of lens 106 increases, extending the focus. When used in conjunction with the zoom lens 216, the result is that even very small misalignments between laser 110 and lens 106 show up dramatically in the image captured by camera 206. In one embodiment, the structure of camera 106 can be fixed to mount 210A so that the distance of the camera 106 and the laser 110 is minimized. The camera 106 is thus fixed in relation to mount 210A, but moves in conjunction therewith. This embodiment can maximize the magnification of camera 106 to reduce error in misalignment.

FIGS. 5 and 6 illustrate another embodiment for a fabrication and alignment device formed from a bottom portion 300A and a top portion 300B. With reference to FIG. 5, bottom portion 300A includes a frame 302, a lower portion 304 of a mounting and alignment assembly, and a camera 306. As illustrated, camera 306 may be mounted below the mounting and alignment assembly, rather than above, as previously illustrated in FIG. 4. The bottom portion 300A of fabrication and alignment device is mounted to a camel workbench 310.

FIG. 6 illustrates the top portion 300B of the fabrication and alignment device. The top portion 300B includes an upper portion 311 of a mounting and alignment assembly that includes a frame 312. Frame 312 of upper portion 311 is configured to couple with frame 302 of lower portion 304. The frames 302, 312 can be made to be temporarily coupled or can be permanently coupled. A first mount 316 for releasably retaining a second portion of the optoelectronic device (and, hence, lens 106) is slidably disposed on frame 312. A second mount 316A for releasably retaining a first portion of the optoelectronic device (and, hence, laser 116) is also slidably disposed on frame 312. Note that this embodiment illustrates that the mount 316, 316A that holds the first or second portion of the optoelectronic device can be reversed. In one embodiment, this reversal can improve manufacturability by improving repetition and precision of processes.

Means 318 are provided for moving the mount 316 in a Z-direction. In one embodiment where the means 318 is a pneumatic cylinder, a first end of the pneumatic cylinder is fixedly connected to frame 312 while the second end is connected to a carriage 320. The carriage 320 is slidably connected to frame 312. In addition, mount 316 is connected to carriage 320. After the portions of the optoelectronic device are aligned, the means 318 can be operated to move carriage 320 along frame 312 in a downward direction so that the portions of the optoelectronic device come in contact with each other. The mount 316 and mount 316a then hold the portions of the optoelectronic device together during a process which forms a hermetically tight joint, for example, by resistance projection welding.

In some embodiments, the portions of the optoelectronic device may simply be tack welded and then permanently resistance welded later. It is generally preferable to perform just one resistance projection welding because one weld results in greater yields than a two-weld process. In embodiments where the optoelectronic device must be hermetically sealed, the final weld (whether a resistance weld after a tack weld, or a one step projection resistance weld) is performed in an inert environment, for example, nitrogen. For example, fabrication and alignment device 200 can be used for tack welding while the fabrication and alignment device formed by a combination of top portion 300A and bottom portion 300B can be used in an enclosed nitrogen environment for one step hermetic projection welding.

IV. An Exemplary Method of Active Alignment

In order to produce an optoelectronic device whose components are properly aligned, such as, for example, the laser package 100, the header structure 101 is actively aligned with the header can 102 prior to attachment of the two parts to each other. In general, "active" alignment refers to processes whereby power is transmitted to the laser 110 and the resulting optical signal generated by the laser 110 is used to align the laser 110 with the lens 106.

The method of the present invention may be implemented by way of various systems and devices, and the scope of the invention should not be construed to be limited to any particular alignment setup, system or device. For example, any of the devices of FIGS. 4 through 6 may be used to actively align portions of the optoelectronic device. In addition, other configurations of a fabrication and alignment device may be used according to the teachings of the present invention.

Exemplarily, camera 206 and zoom lens 216 of device 200 are used in conjunction with the laser 110 and the lens 106 to actively align the laser 110 and lens 106 relative to each other. Prior to alignment, the means 215 is placed in a raised position and the header structure 101 is secured to mount 210 while header can 102 is retained by mount 210A. Once the portions of the optoelectronic device are mounted, the means 215 is lowered to a desired position to create a slight pressure so that clamping between header can 102 and header structure 101 can occur. The means 215 may thus include three positions: a mounting position, an alignment position and a tack welding position. In other words, the present invention contemplates a two-phase connection process—one phase having less presser between the header can 102 and header structure 101 and the second phase having a higher pressure so that the header can 102 and header structure 101 can be connected together. The mounting position is a raised position which provides space for the portions of the optoelectronic device to be mounted to the device 200. The alignment position is a lowered position, which brings the portions of the optoelectronic device together with a slight pressure, so be able to determine an alignment position. Finally, the assembly position brings the portions of the optoelectronic device in contact with each other to be welded or otherwise joined together.

Power is provided to the laser 110 so that the laser produces a laser optical signal which is directed towards header can 102 and the lens 106. As the optical signal emitted by the laser passes through the lens 106 and the zoom lens 216, camera 206 receives an image of the alignment status of the laser 110 relative to the lens 106. Passing the optical signal through the zoom lens 216 and camera 206 is one example of determining a position of the optical signal relative to a reference in order to determine whether the positioning of the optical signal is within a desired tolerance. It will be appreciated that other structures may be used in order to determine the accurate positioning of the optical signal emitted from the laser.

Figure 7:
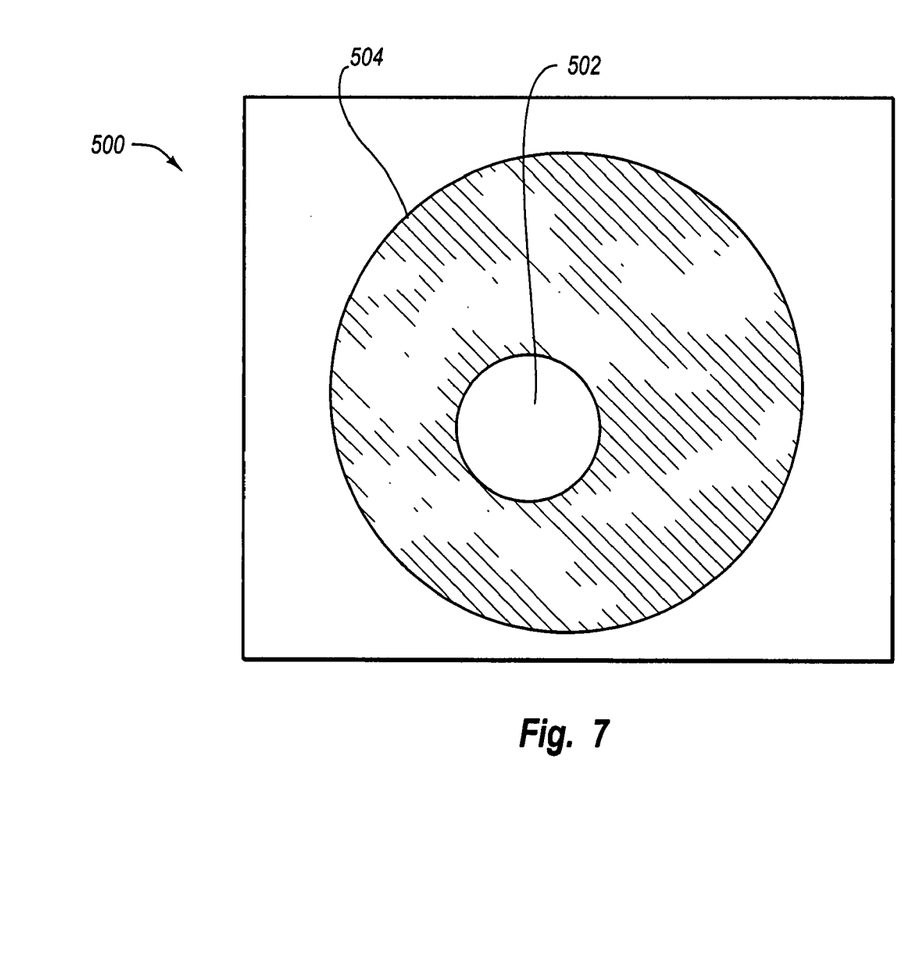
FIG. 7 is an exemplary image produced by a camera and zoom lens contained in one embodiment of a fabrication and alignment device as the exemplary optical components of an optoelectronic device are brought into alignment relative to each other.

FIG. 7 illustrates an exemplary image 500 as received by the camera and zoom lens. The optical signal generated by the laser 110 and transmitted through the lens 106 exemplarily appears as a relatively bright spot 502. The larger target 504 acts as a target which indicates the acceptable tolerance variation with regard to the relative alignment of the laser 110 with respect to the lens 106. To align the laser 110 to the lens 106, the user adjusts the relative alignment of the header structure 101 and header can 102 until the spot 502 is positioned within the larger target 504. In at least some embodiments, the spot 502 is positioned so as to be substantially concentric with the target 504. While target 504 and spot 502 are shown as substantially circular, it will be appreciated that either target 504 or spot 502 could take other shapes. Of course, variables such as the permissible tolerance variation may vary depending upon the application. It will be appreciated that the size of target 504 which represents the permissible tolerance range may change depending on the design parameters of the particular optoelectronic device being assembled.

The position of the header structure 101 (and therefore laser 110) is then adjusted relative to the header can 102 (and therefore lens 106) so as to cause their relative alignment to be within a desired tolerance range. Once the laser 110 and the lens 106 have been suitably aligned in the "x" and "y" axes, the header structure 101 and header can 102 are moved towards each other (along an imaginary "z" axis oriented perpendicular to the plane of the page upon which FIG. 4 appears) so as to cause header structure 101 and header can 102 to mate as illustrated in FIG. 2. The header structure 101 and header can 102 are then joined together, for example by resistance projection welding.

Figure 8:
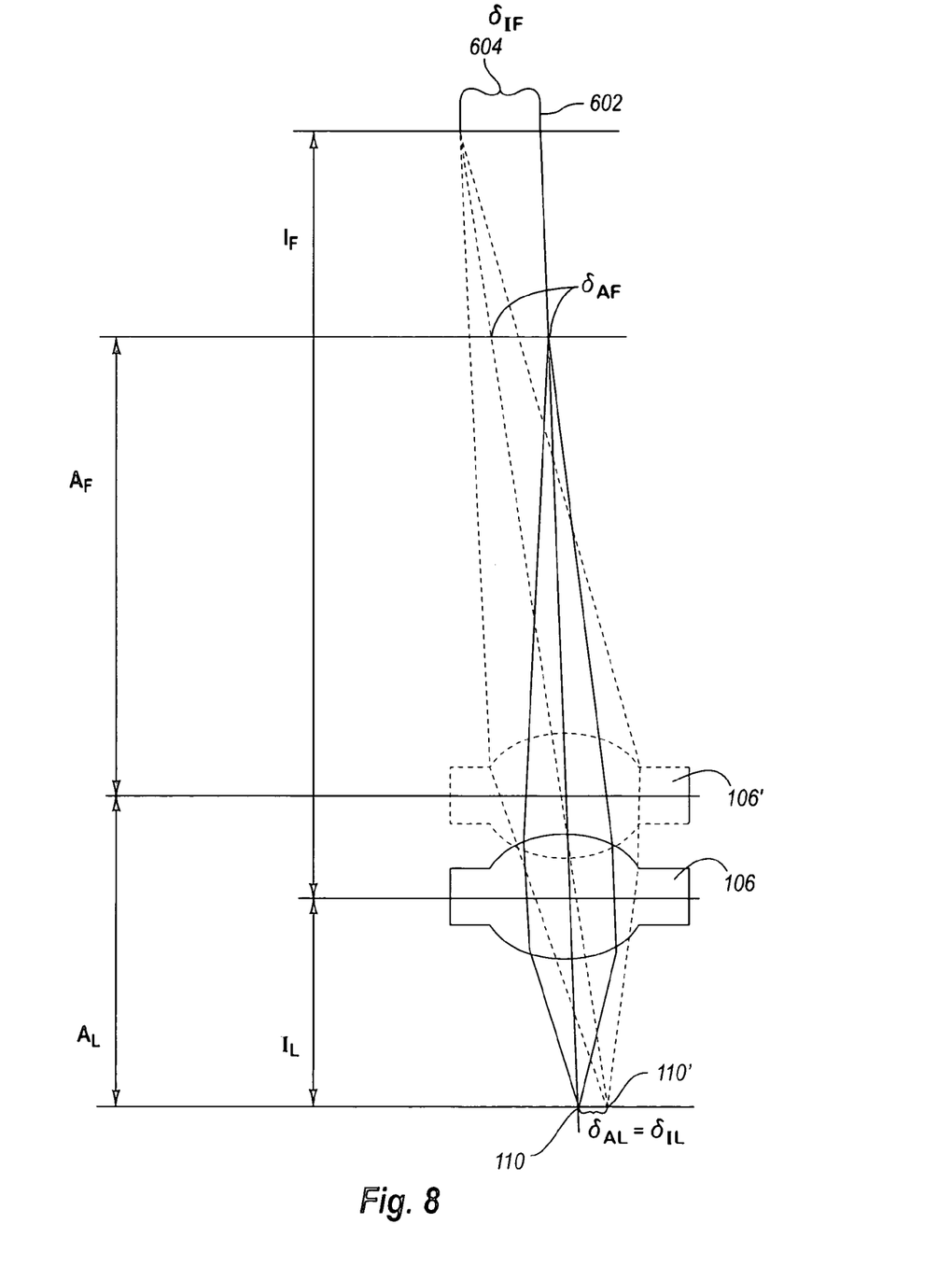
FIG. 8 shows a schematic diagram illustrating how the zoom lens reduces error in the relative alignment of an optical element with a laser.

FIG. 8 illustrates how use of elements of a zoom lens (see, e.g., zoom lens 210A/216 of FIG. 4) reduces error in the relative alignment of lens 106 with laser 110. This is explained where $M_I = I_F/I_L$ and $M_A = A_F/A_L$ and $\delta_{IF} = (M_I)\delta_{IL}$ and $\delta_{AF} = (M_A)\delta_{AF}$. Where $M_I > M_A$, therefore $\delta_{IF} > \delta_{AF}$ because $\delta_{IL} = \delta_{AL}$. Thus, using a large magnification lens will yield the least error, where the error≈1/magnification. Laser 110 fires through lens 106, which, if correctly aligned, tracks line 602, which represents the line of perfect center. If the laser is positioned instead at 110' relative to the lens positioned at 106', then an offset 604 from line of perfect center 602 occurs. The amount of the error offset 604 is inversely proportional to the magnification of the lens (or lenses) that the optical signal emitted by laser 110 passes through. Thus, including magnification lenses in the path of the optical signal increases the alignment accuracy that may be achieved.

Among other advantages, the present invention enables production of an optoelectronic device, such as a laser package, having a high degree of alignment accuracy. Such high quality optoelectronic components can then be used in various optoelectronic devices to increase the quality, accuracy, and longevity, of the optoelectronic device.

What is claimed is:

1. A system for optically aligning two portions of an optoelectronic device, a first portion containing a laser and a second portion containing an optical element, the system comprising:

a frame;

a mounting and alignment assembly attached to the frame, comprising:

a first mount at least indirectly attached to the frame and configured to removably retain the first portion of the optoelectronic device;

a second mount at least indirectly attached to the frame and configured to removably retain the second portion of the optoelectronic device; and means for moving at least one of the first mount and second mount in relation to the frame in at least one dimension so that the first portion and the second portion of the optoelectronic device are situated such that the laser can optically couple with the optical element; and camera mounted on the frame, the camera comprising a lens configured to be disposed in the optical path of the laser for imaging an optical signal emitted from the laser.

2. The system as recited in claim 1, wherein the lens of the camera is configured to enlarge the optical signal emitted from the laser.

3. The system as recited in claim 1, wherein the image produced by the camera includes a target which indicates the desired tolerance range of alignment.

4. The system as recited in claim 1, wherein means for moving at least one of the first mount and second mount in relation to the frame in at least one dimension comprises a base connected to the frame, wherein at least one of the first mount and the second mount is disposed on the base.

5. The system as recited in claim 4, further comprising a threaded rod disposed through the first mount or second mount that is disposed on the base and a wheel connected to the threaded rod.

6. The system as recited in claim 1, wherein means for moving at least one of the first mount and second mount in relation to the frame in at least one dimension comprises a carriage slidably connected to the frame, wherein one of the first mount and the second mount is connected to the carriage.

7. The system as recited in claim 1, wherein the camera is configured to move in relation to the frame in at least one dimension.

8. The system as recited in claim 7, wherein further comprising a pneumatic cylinder having a first end connected to the frame and a second end connected to the camera.

9. The system as recited in claim 1, further comprising a projection welding electrode for welding together the first portion and the second portion of the optoelectronic device.

* * * * *

UNITED STATES PATENT AND TRADEMARK OFFICE
CERTIFICATE OF CORRECTION

PATENT NO. : 7,202,952 B2  Page 1 of 1
APPLICATION NO. : 10/925388
DATED : April 10, 2007
INVENTOR(S) : Hu et al.

It is certified that error appears in the above-identified patent and that said Letters Patent is hereby corrected as shown below:

Title Page
Page 2, Column 1, remove reference:
"2004/0197254    A1           10/2004 Farr"

Column 8
Line 22, after "means 215", insert --for moving at least one of the mounts--
Line 26, after "means 215", insert --for moving at least one of the mounts--
Line 28, after "means 215", insert --for moving at least one of the mounts--
Line 32, change "presser" to --pressure--

Column 9
Line 23, change "210A/216" to --216--

Signed and Sealed this

Eleventh Day of November, 2008

JON W. DUDAS
*Director of the United States Patent and Trademark Office*